US011973423B2

(12) United States Patent
Cheng et al.

(10) Patent No.: US 11,973,423 B2
(45) Date of Patent: Apr. 30, 2024

(54) SWITCHING CONVERTER WITH PULSE TRUNCATION CONTROL

(71) Applicant: Texas Instruments Incorporated, Dallas, TX (US)

(72) Inventors: Kuang-Yao Cheng, Phoenix, AZ (US); Muthusubramanian Venkateswaran, Bengaluru (IN); Dattatreya Baragur Suryanarayana, Bengaluru (IN); Preetam Charan Anand Tadeparthy, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 7 days.

(21) Appl. No.: 17/238,979

(22) Filed: Apr. 23, 2021

(65) Prior Publication Data
US 2021/0242779 A1 Aug. 5, 2021

Related U.S. Application Data

(63) Continuation of application No. 16/586,316, filed on Sep. 27, 2019, now Pat. No. 11,031,868.

(51) Int. Cl.
H02M 3/158 (2006.01)
H02M 1/00 (2006.01)

(52) U.S. Cl.
CPC ......... H02M 3/158 (2013.01); H02M 1/0061 (2013.01); H02M 1/0016 (2021.05); H02M 1/0067 (2021.05); H02M 1/0077 (2021.05); H02M 3/1586 (2021.05)

(58) Field of Classification Search
CPC ........ G05F 1/562; G05F 1/575; H02M 3/156; H02M 3/157; H02M 3/158
USPC .................................. 323/274–275, 283–285
See application file for complete search history.

(56) References Cited

U.S. PATENT DOCUMENTS

| 6,844,710 | B2* | 1/2005 | Lipcsei ................. H02M 3/156 323/284 |
| 6,943,535 | B1 | 9/2005 | Schiff |
| 7,615,981 | B2* | 11/2009 | Wong .................... H02M 3/156 323/299 |
| 7,834,606 | B2* | 11/2010 | Liu ........................ H02M 3/157 323/283 |
| 8,643,354 | B2 | 2/2014 | Chang et al. |
| 8,907,642 | B1 | 12/2014 | Burnstein et al. |
| 9,647,541 | B2* | 5/2017 | Fan .................... H02M 3/33507 |
| 9,660,534 | B2 | 5/2017 | Jiang et al. |
| 9,806,619 | B2 | 10/2017 | Wu et al. |
| 2002/0125869 | A1* | 9/2002 | Groom ................ H02M 3/1584 323/283 |

(Continued)

Primary Examiner — Gary A Nash
(74) Attorney, Agent, or Firm — Ray A. King; Frank D. Cimino

(57) ABSTRACT

A system includes a load and a switching converter coupled to the load. The switching converter includes at least one switching module and an output inductor coupled to a switch node of each switching module. The switching converter also includes a controller coupled to each switching module, where the controller is configured to adjust a pulse clock rate and a switch on-time for each switching module. The controller comprises a pulse truncation circuit configured to detect a voltage overshoot condition and to truncate an active switch on-time pulse in response to the detected voltage overshoot condition.

19 Claims, 14 Drawing Sheets

(56) References Cited

U.S. PATENT DOCUMENTS

2010/0079122 A1* 4/2010 Bodano ................ H02M 3/156
                                                              323/282
2016/0301303 A1* 10/2016 Bari ..................... H02M 3/156

* cited by examiner

SWITCHING CONVERTER WITH PULSE TRUNCATION CONTROL

CROSS-REFERENCE TO RELATED APPLICATION(S)

This application is a continuation of U.S. Non-Provisional application Ser. No. 16/586,316 filed Sep. 27, 2019, titled "Switching Converter with Pulse Truncation Control," which is hereby incorporated herein by reference in its entirety.

BACKGROUND

In a single-phase switching converter, switches are opened and closed to control the amount of and the direction of current in a single output inductor. The voltage at the output node of the single-phase switching converter is a function of the current in the output inductor. An output capacitor is used to store charge at the output node of the switching converter. The output node is coupled to a load, which usually varies over time.

In a multi-phase switching converter, a plurality of converter circuits, each with its own output inductor, are clocked at different phases. The outputs from the plurality of converter circuits are combined at the output node of the multi-phase switching converter. With a multi-phase converter, the amount of voltage ripple at the output node is reduced compared to single-phase converters.

For both single-phase and multi-phase switching converters, the switch on-time for different switches is predetermined using techniques such as pulse-width modulation (PWM) or pulse-frequency modulation (PFM). While these techniques have been acceptable, efforts to better reduce output voltage (VOUT) overshoot conditions or otherwise reduce VOUT ripple are ongoing.

SUMMARY

In accordance with at least one example of the disclosure, a system comprises a load and a switching converter coupled to the load. The switching converter comprises at least one switching module and an output inductor coupled to a switch node of each switching module. The switching converter also comprises a controller coupled to each switching module, wherein the controller is configured to adjust a pulse clock rate and a switch on-time for each switching module. The controller comprises a pulse truncation circuit configured to detect a voltage overshoot condition and to truncate an active switch on-time pulse in response to the detected voltage overshoot condition.

In accordance with at least one example of the disclosure, a switching converter circuit comprises a switching module and a controller coupled to the switching module. The controller comprises a pulse truncation circuit having a comparator with a first input node coupled to an output node of the switching converter circuit and with a second input node coupled to an overshoot voltage threshold node. The controller also comprises a switch on-time circuit coupled to the pulse truncation circuit. The switch on-time circuit comprises a pulse control latch coupled to the pulse truncation circuit.

In accordance with at least one example of the disclosure, a multi-phase switching converter circuit comprises a plurality of switch on-time circuits, each of the plurality of switch on-time circuits coupled to a respective switching module. The multi-phase switching converter circuit also comprises pulse truncation circuitry coupled to the plurality of switch on-time circuits. The pulse truncation circuitry is configured to truncate an active switch on-time pulse in response to a detected voltage overshoot condition.

BRIEF DESCRIPTION OF THE DRAWINGS

For a detailed description of various examples, reference will now be made to the accompanying drawings in which.

DETAILED DESCRIPTION

Described herein are switching converters with pulse truncation control. In some examples, the disclosed switching converters also include on-time compensation control that accounts for pulse truncation. In different examples, switching converters with pulse truncation control may be single-phase or multi-phase switching converters. In some examples of a single-phase switching converter with pulse truncation, on-time compensation is applied to a single pulse in response to pulse truncation. The amount of on-time compensation applied to a single later pulse (e.g., to increase the duration of the single pulse) may be based on the amount of pulse truncation, or another control scheme. In other examples of a single-phase switching converter with pulse truncation, on-time compensation is applied to multiple pulses in response to pulse truncation. The amount of on-time compensation applied to multiple later pulses (e.g., to increase the duration of each of the multiple pulses) may be based on the amount of pulse truncation, or another control scheme.

In some examples of a multi-phase switching converter with pulse truncation, on-time compensation is applied to a single later pulse in response to pulse truncation. The amount of on-time compensation applied to a single later pulse (e.g., to increase the duration of the single pulse) may be based on the amount of pulse truncation, or another control scheme. In other examples of a multi-phase switching converter with pulse truncation, on-time compensation is applied to the later pulses of different phases in response to pulse truncation. The amount of on-time compensation applied to the later pulses of different phases (e.g., to increase or decrease the duration of these pulses) may be based on the amount of pulse truncation, or another control scheme. With the disclosed pulse truncation options, the amount of output voltage overshoot is reduced. With the disclosed on-time compensation options, inductor current imbalance issues are reduced. To provide a better understanding, various options for switching converters with pulse truncation are described using the figures as follows.

Figure 1:
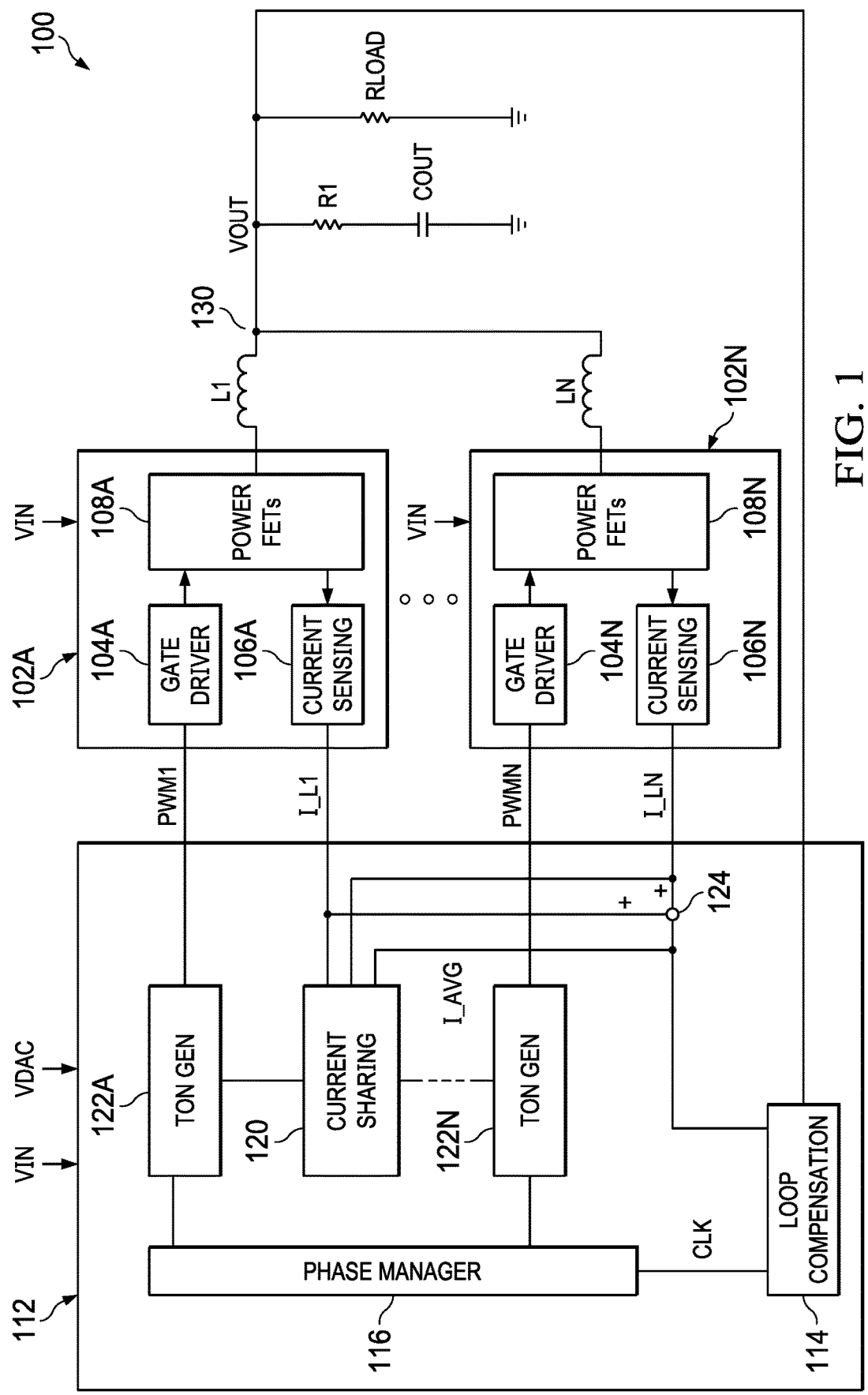
FIG. 1 is a schematic diagram showing a multi-phase switching converter in accordance with various examples.

FIG. 1 is a schematic diagram showing a multi-phase switching converter 100 in accordance with various examples. As shown, the multi-phase switching converter 100 includes a plurality of switching modules 102A-102N. In the example of FIG. 1, each of the plurality of switching modules 102A-102N includes a respective gate driver (e.g., gate drivers 104A-104N), a respective current sensing circuit (e.g., current sensing circuits 106A-106N), and respective switches (e.g., power field-effect transistors (FETs) 108A-108N). In other examples, each of the switching modules 102A-102N includes additional or fewer components. As shown, each output of the plurality of switching modules 102A-102N is coupled to an output node 130 via a respective output inductor (e.g., L1-LN). The output node 130 is also coupled to a first (e.g., top) terminal of an output capacitor (COUT) via a resistor (R1), which represents an equivalent series resistance (ESR) for COUT. A second (e.g., bottom terminal) of COUT is coupled to a ground node. Also, the output node 130 is coupled to a load (RLOAD), which is powered based on the operations of the switching modules 102A-102N and a controller 112.

In the example of FIG. 1, the controller 112 includes a loop compensation circuit 114, a phase manager circuit 116, a current sharing circuit 120, on-time (Ton) generator circuits 122A-122N, and a combine circuit 124. More specifically, the loop compensation circuit 114 is coupled to the output node 130, the current sharing circuit 120, and the combine circuit 114. In operation, the loop compensation circuit 114 provides a clock signal (CLK) to the phase manager circuit 116, where CLK is based on VOUT, a combined current value provided by the combine circuit 124 (the combination of sensed values labeled I_L1 to I_LN), and an average inductor current value (I_AVG) provided by the current sharing circuit 120. The phase manager 116 selects the phase for each of the Ton generator circuits 122A-122N, which output pulses based on CLK and the phase selected by the phase manager 116. The pulses output from the Ton generator circuits 122A-122N are provided to respective switching modules 102A-102N to control when respective power FETs 108A-108N are on. In the example of FIG. 1, the pulses output from the Ton generator circuits 122A-122N are pulse-width modulation (PWM) signals (PWM1-PWMN).

Figure 2:
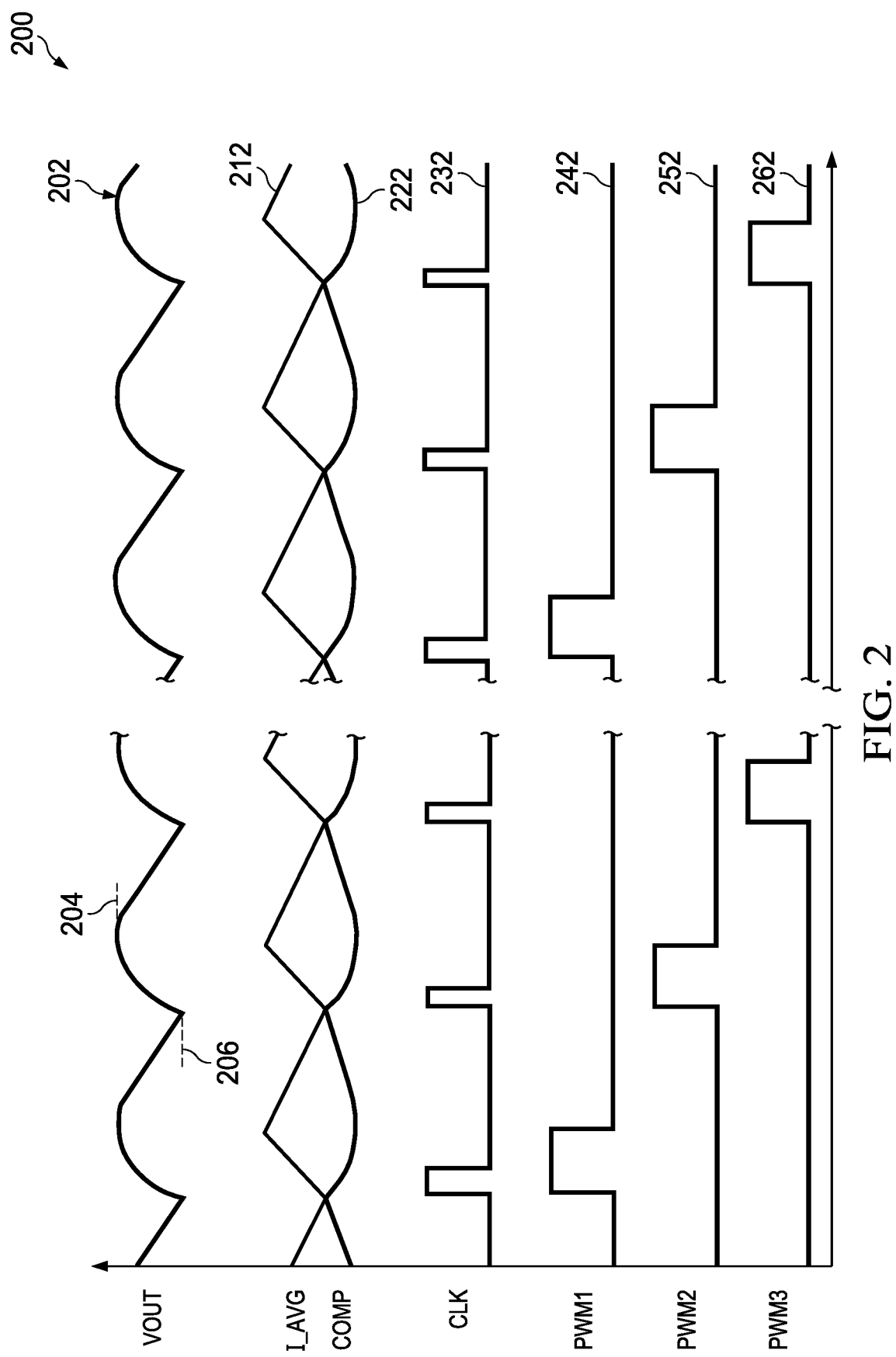
FIG. 2 is a timing diagram showing waveforms for a multi-phase switching converter in accordance with various examples.

FIG. 2 is a timing diagram 200 showing waveforms (e.g., waveforms 202, 212, 222, 232, 242, 252, and 262) for a multi-phase switching converter (e.g., the multi-phase switching converter 100 of FIG. 1) in accordance with various examples. More specifically, the waveform 202 corresponds to a VOUT signal, the waveform 212 corresponds to a I_AVG signal, the waveform 222 corresponds to a compensation (COMP) signal, the waveform 232 corresponds to a CLK signal, and the waveforms 242, 252, and 262 correspond to PWM signals (e.g., PWM1, PWM2, and PWM3). In the timing diagram 200, VOUT moves back and forth between an upper threshold 204 and a lower threshold 206 as represented with the waveform 202. Also, the changes in VOUT are a function of I_AVG as represented with the waveforms 202 and 212 (when I_AVG is increasing, VOUT increases). In the example of FIG. 2, COMP is a signal internal to the loop compensation circuit 114 (e.g., COMP or a representative signal is one of the inputs to a comparator of the loop compensation circuit 114, where the comparator output results in the CLK signal). In some examples, the COMP signal may be obtained using a transconductance gain stage the receives VOUT, target regulation reference voltage, VREF, and the total current (I_L1 to I_LN) as inputs. As shown, the CLK signal represented by the waveform 232 is used to determine the timing of the pulses for PWM1, PWM2, and PWM3. More specifically, the rising edge for each pulse of the CLK signal is used to initiate a different PWM pulse (e.g., PWM1, PWM2, PWM3).

Figure 3:
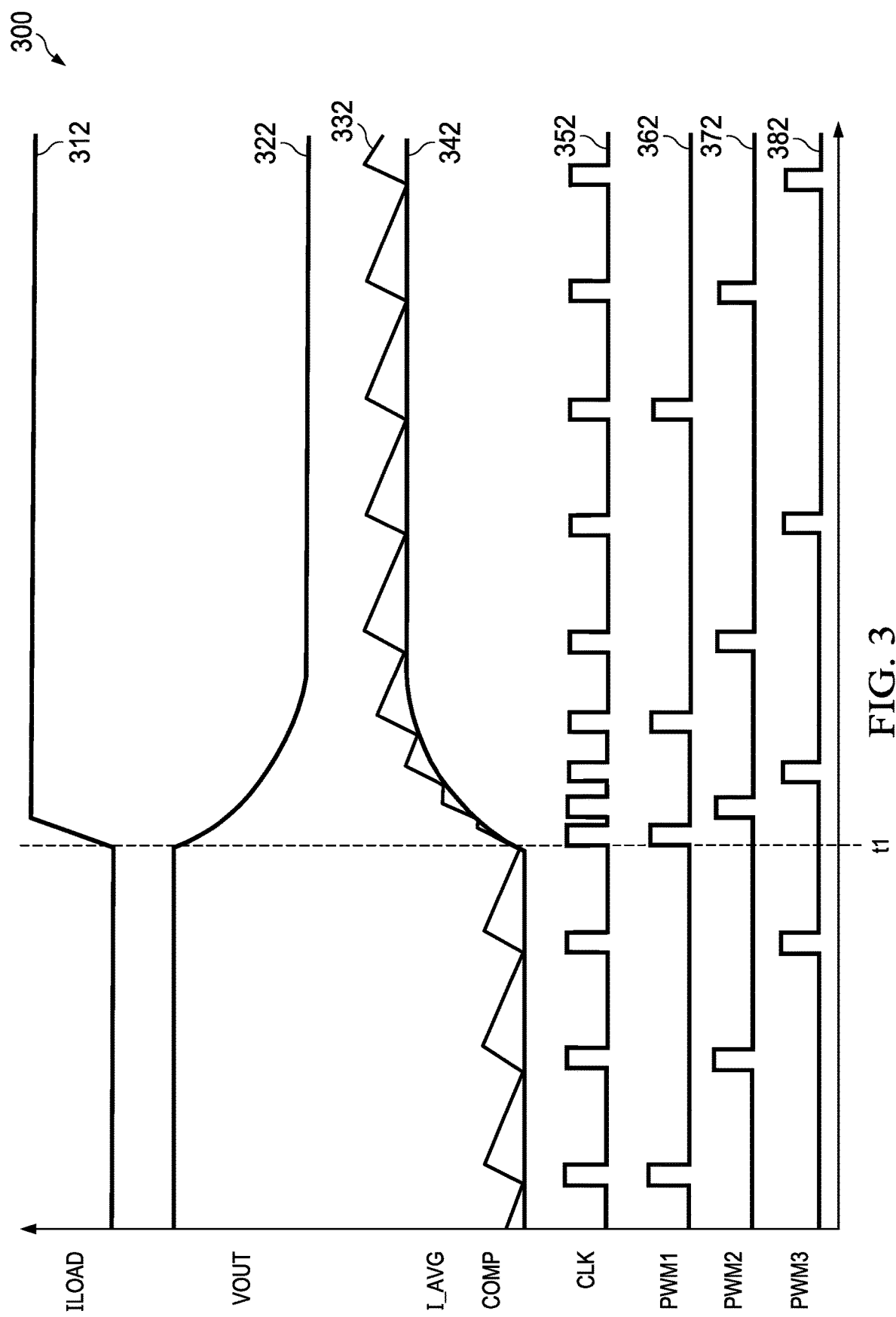
FIG. 3 is a timing diagram showing waveforms for a load step-up scenario for a multi-phase switching converter in accordance with various examples.

FIG. 3 is a timing diagram 300 showing waveforms (e.g., waveforms 312, 322, 332, 342, 352, 362, 372, and 382) for a load step-up scenario for a multi-phase switching converter (e.g., the switching converter 100 on FIG. 1) in accordance with various examples. More specifically, the waveform 312 corresponds to an ILOAD signal, the waveform 322 corresponds to a VOUT signal, the waveform 332 corresponds to a I_AVG signal, the waveform 342 corresponds to a COMP signal, the waveform 352 corresponds to a CLK signal, and the waveforms 362, 372, and 382 correspond to PWM signals (e.g., PWM1, PWM2, and PWM3). In the timing diagram 300, ILOAD transitions from low to high starting at a given time, t1, as represented by the waveform 312. Also, VOUT begins to decrease starting at t1 as represented by the waveform 322. Also, I_AVG begins to increase starting at t1 as represented by the waveform 332. As shown, the COMP signal tracks I_AVG by connecting the low points (valley points) of I_AVG as represented by the waveform 342. Also, the frequency of the CLK signal increases for some time starting at t1 as represented by the waveform 352. With the increased frequency of the CLK signal at t1, the phases of the multi-phase signals for PMW1, PWM2, and PWM3 are closer together.

Figure 4:
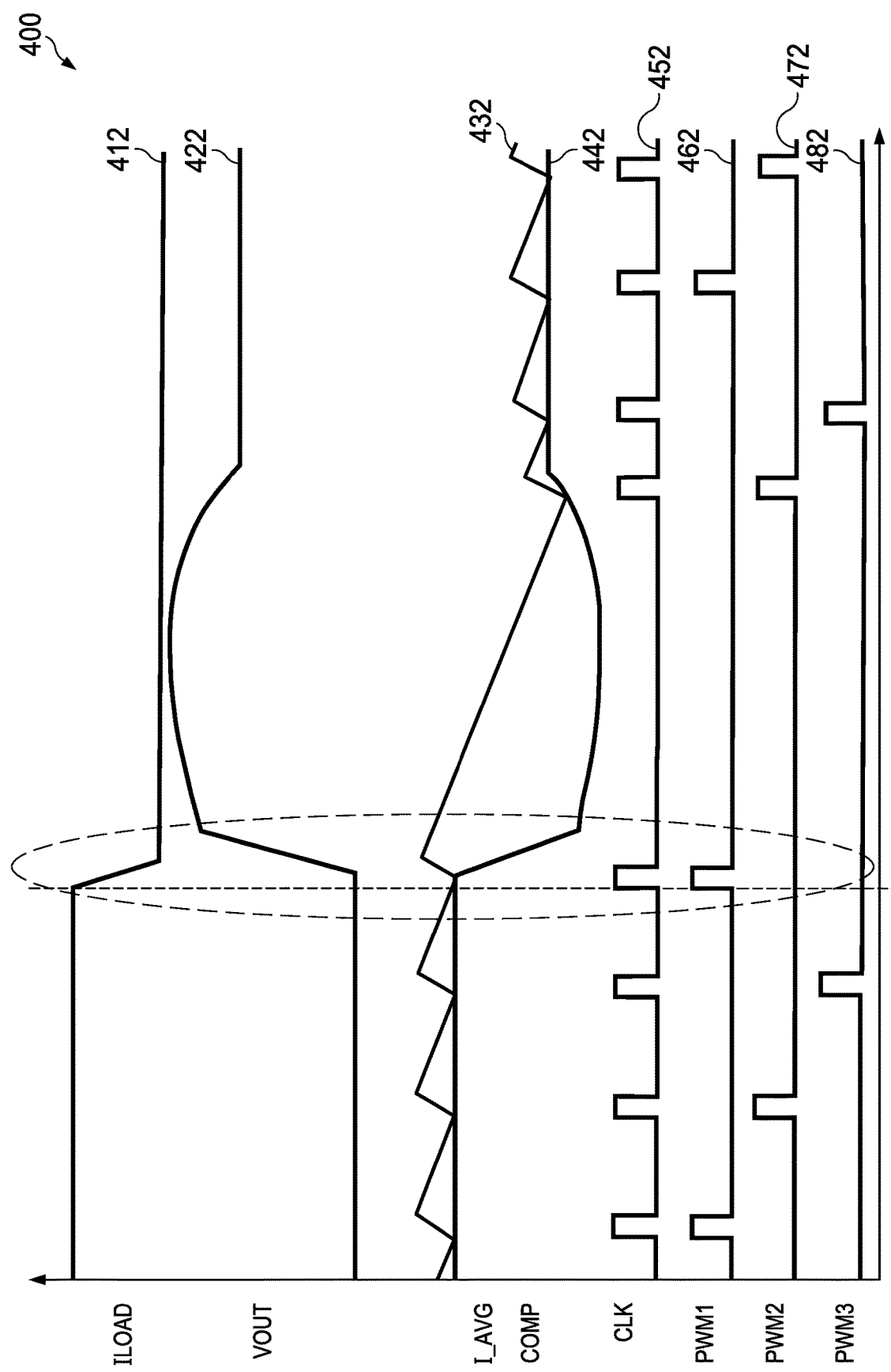
FIG. 4 is a timing diagram showing waveforms for a load step-down scenario for a multi-phase switching converter in accordance with various examples.

FIG. 4 is a timing diagram 400 showing waveforms (e.g., waveforms 412, 422, 432, 442, 452, 462, 472, and 482) for a load step-down scenario for a multi-phase switching converter (e.g., the switching converter 100 on FIG. 1) in accordance with various examples. More specifically, the waveform 412 corresponds to an ILOAD signal, the waveform 422 corresponds to a VOUT signal, the waveform 432 corresponds to a I_AVG signal, the waveform 442 corresponds to a COMP signal, the waveform 452 corresponds to a CLK signal, and the waveforms 462, 472, and 482 correspond to PWM signals (e.g., PWM1, PWM2, and PWM3). In the timing diagram 400, ILOAD transitions from high to low starting at a given time, t2, as represented by the waveform 412. Also, VOUT begins to increase starting at t2 as represented by the waveform 422. Also, I_AVG begins to decrease starting at t2 as represented by the waveform 432. As shown, the COMP signal tracks I_AVG by connecting the low points (valley points) of I_AVG as represented by the waveform 442. Also, the frequency of the CLK signal decreases for some time starting at t2 as represented by the waveform 452. With the decreased frequency of the CLK signal at t2, the phases of the multi-phase signals for PMW1, PWM2, and PWM3 are further apart. The load step-down scenario of the timing diagram 400 results in a voltage overshoot condition, where extra energy is provided to the output capacitors (e.g., COUT in FIG. 1). Reducing or avoiding a voltage overshoot condition improves efficiency of a switching converter.

Figure 5:
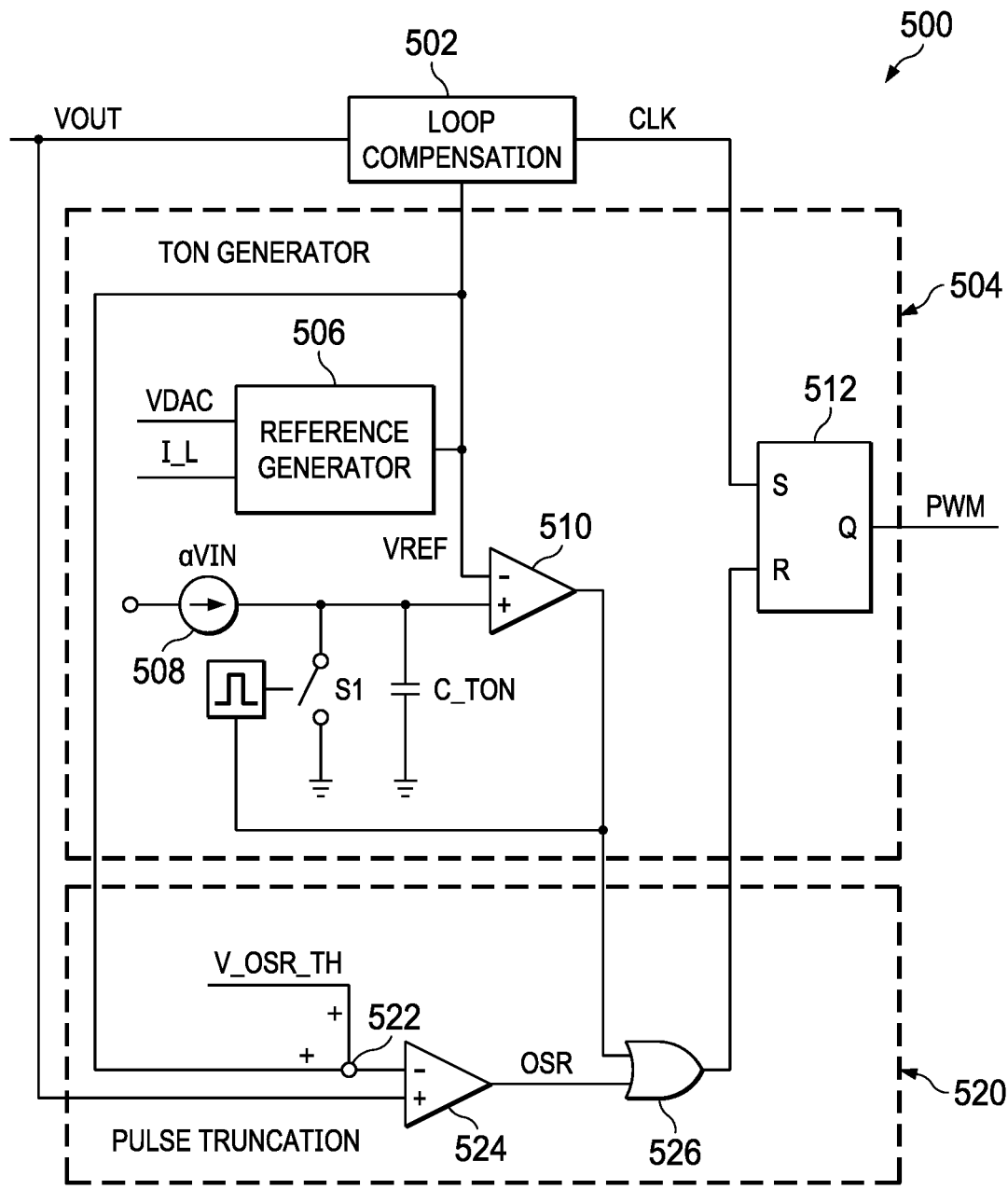
FIG. 5 is a schematic diagram showing a switching converter controller with a pulse truncation circuit in accordance with various examples.

FIG. 5 is a schematic diagram showing a switching converter controller 500 with a pulse truncation circuit 520 in accordance with various examples. As shown, the switching converter controller 500 also includes a Ton generator circuit 504 and a loop compensation circuit 502. In the example of FIG. 5, the loop compensation circuit 502 provides a CLK signal based on VOUT and VREF. More specifically, VOUT is provided by an output node (e.g., the output node 130 in FIG. 1), and VREF is provided by a reference generator circuit 506. In the example of FIG. 5, the reference generator circuit 506 provides VREF based on a VDAC value and an inductor current sense value (I_L). The I_L value is received, for example, from a current sensing circuit (e.g., one of the current sensing circuits 106A-106N). Meanwhile, the VDAC value is a pre-set regulation target voltage, or can be received from the microprocessor. As shown, the reference generator circuit 506 is part of the Ton generator circuit 504 in the example of FIG. 5. In other examples, the reference generator circuit 506 is coupled to the Ton generator circuit 504 to provide VREF to a comparator 510 of the Ton generator circuit 504. The comparator 510 outputs a high signal when the voltage on C_TON is greater than VREF. Otherwise, the comparator 510 outputs a low signal.

In the example of FIG. 5, aVIN is selectively provided to the comparator 510 using a current source 508 and a switch (S1). When S1 is open, aVIN charges a capacitor (C_TON) and is provided to the positive input terminal of the comparator 510, where a is selected based on the desired switching frequency. Once the voltage on C_TON is greater than VREF, the comparator 510 outputs a high signal, which will close S1 to discharge the voltage on C_TON to ground. As shown, the output of the comparator 510 is one of the inputs to an OR gate 526 of the pulse truncation circuit 520. The other input to the OR gate 526 is the output of a comparator 524 of the pulse truncation circuit 520. The inputs to the comparator 524 include the output of a combine circuit 522 and VOUT. As shown, the inputs to the combine circuit 522 include VREF and an overshoot voltage threshold value (V_OSR_TH). When VOUT is greater than the output of the combine circuit 522, the output of the comparator 524 is high. When the output of the OR gate 526 is high, the R input of the RS latch 512 is high, and the output from the RS latch 512 is low. On the other hand, when the output of the OR gate 524 is low, the R input of the RS latch 512 is low, and the CLK signal provided by the loop compensation circuit 502 is output from the RS latch 512 as a PWM signal.

Figure 6:
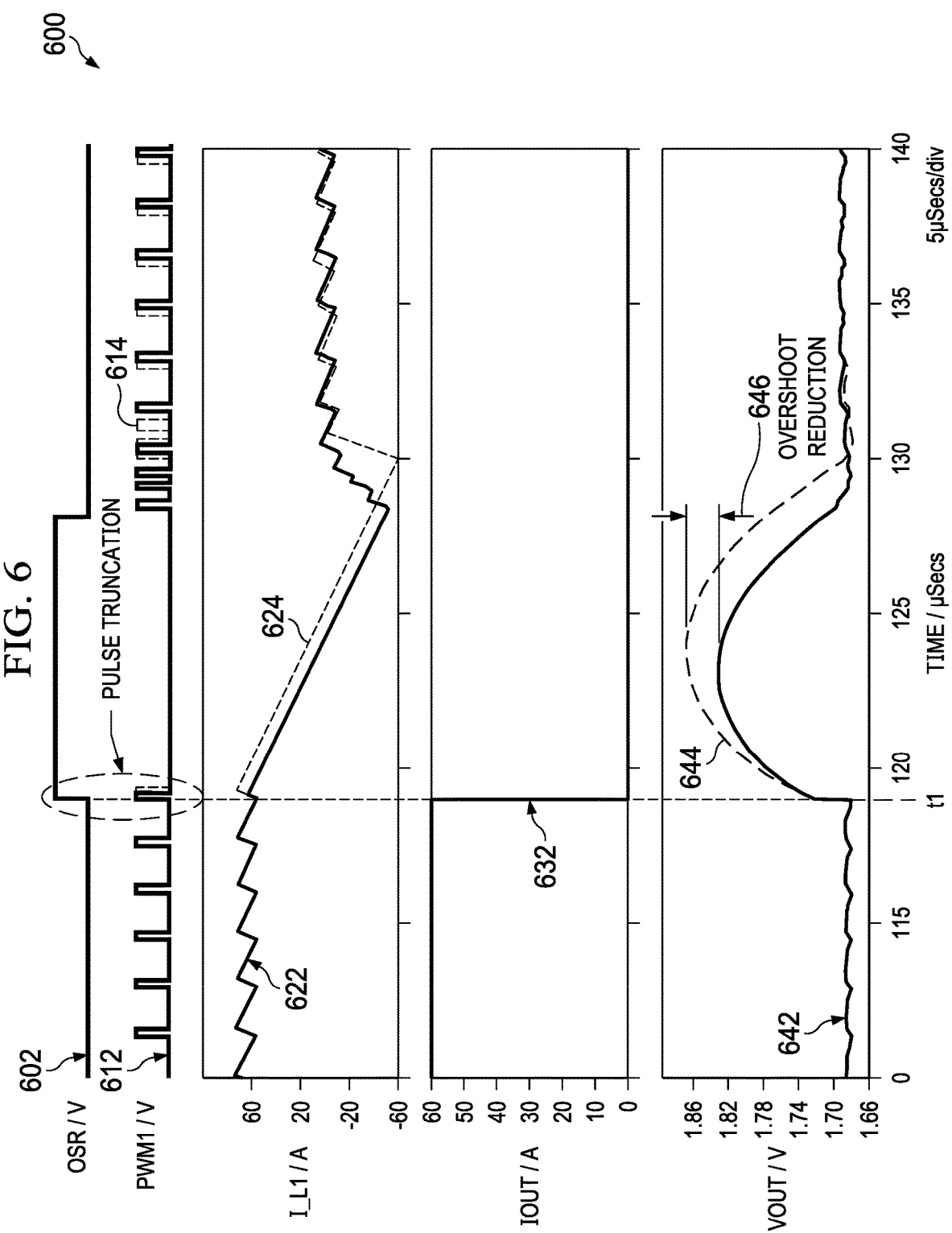
FIG. 6 is a timing diagram showing waveforms related to a pulse truncation control scenario in accordance with various examples.

FIG. 6 is a timing diagram 600 showing waveforms (e.g., waveforms 602, 612, 622, 632, 642) related to a pulse truncation control scenario in accordance with various examples. More specifically, the waveform 602 corresponds to an overshoot reduction (OSR) signal, the waveform 612 corresponds to a PWM signal (e.g., PWM1), the waveform 622 corresponds to an inductor current signal (e.g., I_L1), the waveform 632 corresponds to an output current signal (IOUT), and the waveform 642 corresponds to VOUT signal. In the timing diagram 600, the time before t1 is a high load condition, where IOUT is high, pulses for PWM1 are steady, I_L1 transitions between upper and lower values as a function of PWM1 edges, and VOUT stays near a low value as represented by the waveforms 612, 622, 632, and 642. At t1, the load transitions from a high load to a low load. As a result, IOUT goes low and VOUT begins to increase as represented by the waveforms 632 and 642. In response to VOUT increasing above a threshold, the OSR signal goes high, which results in pulse truncation being performed. With pulse truncation, I_L1 begins discharging sooner than if no pulse truncation were performed (waveform 624 represents I_L1 without pulse truncation). With pulse truncation, an overshoot reduction 646 in VOUT is achieved compared to VOUT without pulse truncation as represented by the waveforms 642 and 644 (the waveform 644 represents VOUT without pulse truncation). In the timing diagram 600, a single-phase pulse truncation scenario is represented. In other examples, multi-phase pulse truncation is performed.

Figure 7:
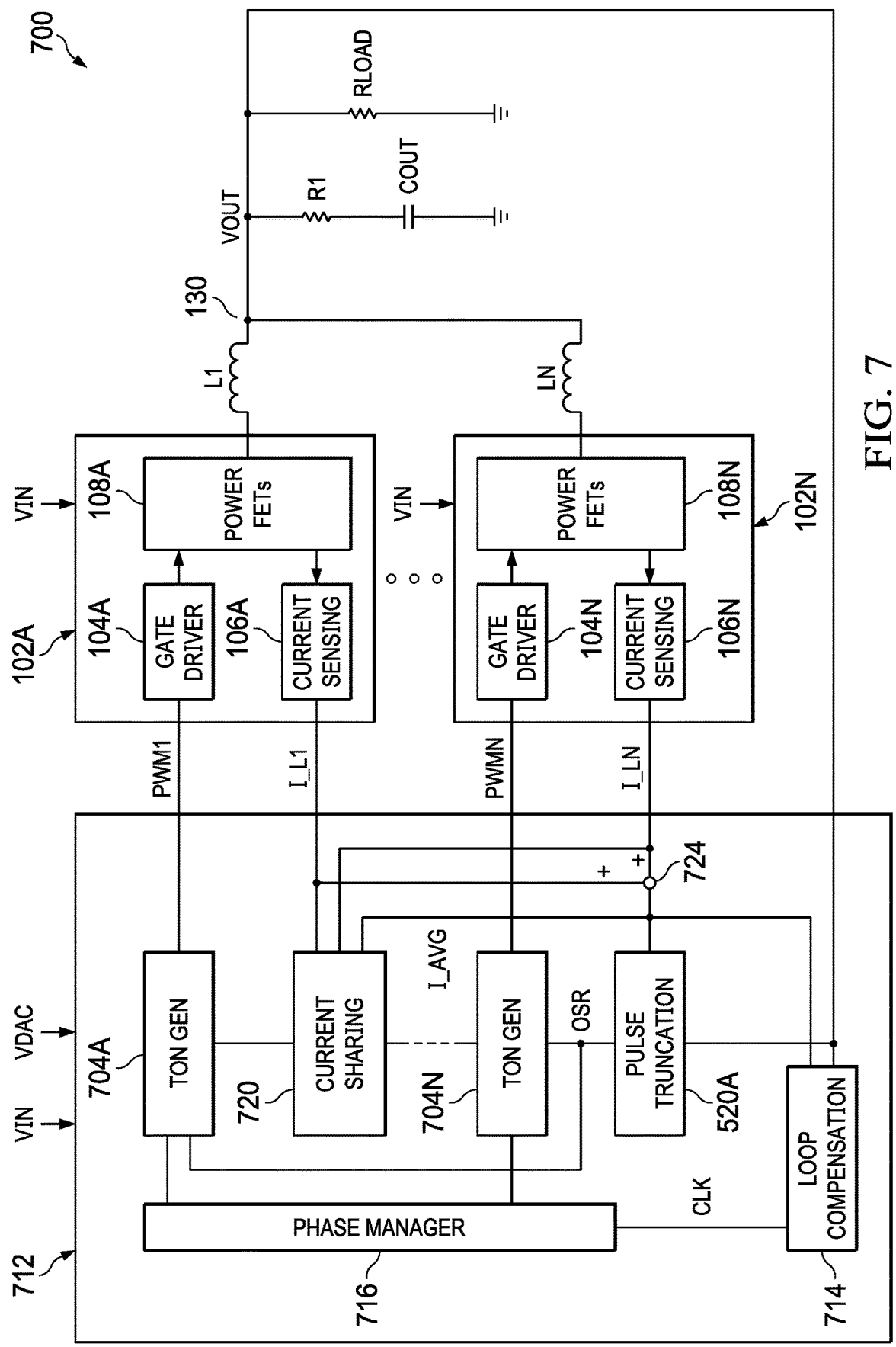
FIG. 7 is a schematic diagram showing a multi-phase switching converter with a pulse truncation circuit in accordance with various examples.

FIG. 7 is a schematic diagram showing a multi-phase switching converter 700 with a pulse truncation circuit 520A (an example of the pulse truncation circuit 520 in FIG. 5) in accordance with various examples. As shown, the multi-phase switching converter 700 includes the switching modules 102A-102N described in FIG. 1, along with L1-LN, R1, COUT, and RLOAD. Again, each of the plurality of switching modules 102A-102N includes a respective gate driver (e.g., gate drivers 104A-104N), a respective current sensing circuit (e.g., current sensing circuits 106A-106N), and respective switches (e.g., power FETs 108A-108N). In other examples, each of the switching modules 102A-102N includes additional or fewer components. Again, each output of the plurality of switching modules 102A-102N is coupled to the output node 130 via respective output inductors (L1-LN). The output node 130 is coupled to RLOAD, which is powered based on the operations of the switching modules 102A-102N and a controller 712.

In the example of FIG. 7, the controller 712 includes a loop compensation circuit 714 and a phase manager circuit 716 (comparable to the loop compensation circuit 114 and the phase manager circuit 116 in FIG. 1), a current sharing circuit 720 (comparable to the current sharing circuit 120 in FIG. 1), Ton generator circuits 704A-704N, and a combine circuit 724 (comparable to the combine circuit 124 in FIG. 1). In some examples, each of the Ton generator circuits 704A-704N includes the circuitry of the Ton generator circuit 504 in FIG. 5. Also, the controller 712 includes a pulse truncation circuit 520A (an example of the pulse truncation circuit 520 in FIG. 5). In operation, the pulse truncation circuit 520A is configured to output an OSR signal in response to VOUT being greater than a threshold. The OSR signal is used by each of the Ton generator circuits 704A-704N to prevent CLK signals from being output while the OSR signal is high. Once the OSR signal is low again, the Ton generator circuits 704A-704N pass CLK signals unless aVIN is greater than VREF (e.g., unless the other input to the OR gate 526 in FIG. 5 is high). With the multi-phase switching converter 700 of FIG. 7, pulse truncation operations reduce VOUT overshoot.

Figure 8A:
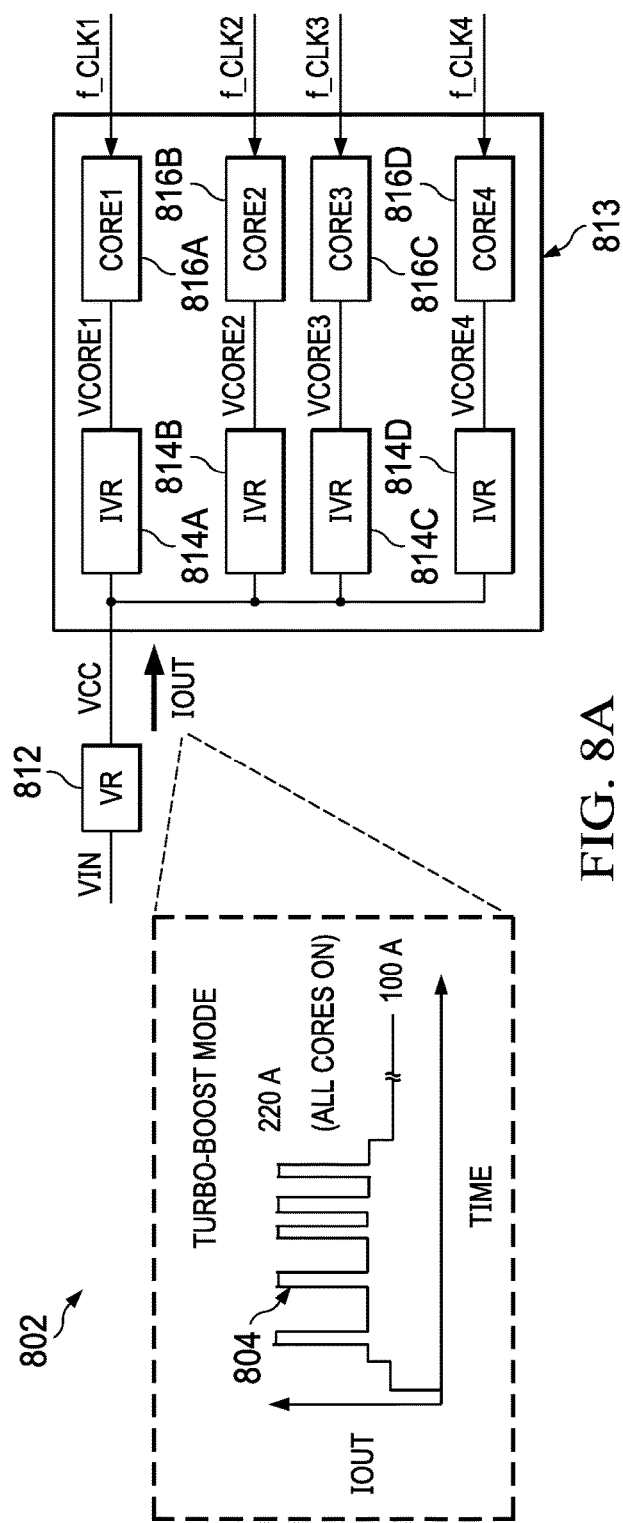
FIG. 8A is a block diagram and graph showing a multi-core processor and related modes in accordance with various examples.

FIG. 8A is a block diagram and graph 802 showing a multi-core processor 813 and related modes in accordance with various examples. In FIG. 8, the multi-core processor 813 includes a plurality of cores 816A-816 and respective Integrated Voltage Regulator (IVR) circuits 814A-814D. As shown, the IVR circuits 814A-814D receive a voltage supply (VCC) signal from a voltage regulator 812 and provide respective voltages (VCORE1-VCORE4) to each of the cores 816A-816D. The cores 816A-816D also receive respective frequencies (f_CLK1-f_CLK4). In accordance with some examples, the voltage regulator 812 is a single-phase or multi-phase switching converter with pulse truncation as described herein. The voltage regulator 812 may also include on-time compensation as described herein. As shown in graph 802, the output current (IOUT) 804 provided from the voltage regulator 812 to the multi-core processor 813 varies over time, where the highest values for IOUT are due to a turbo-boost mode in which all of the cores 816A-816D are on and are clocked at a turbo-boost frequency. In the example of FIG. 8A, IOUT ranges between 100 A-220 A amps. In other examples, IOUT may vary depending on the number of cores a multi-core processor has and the frequency of operation.

Figure 8B:
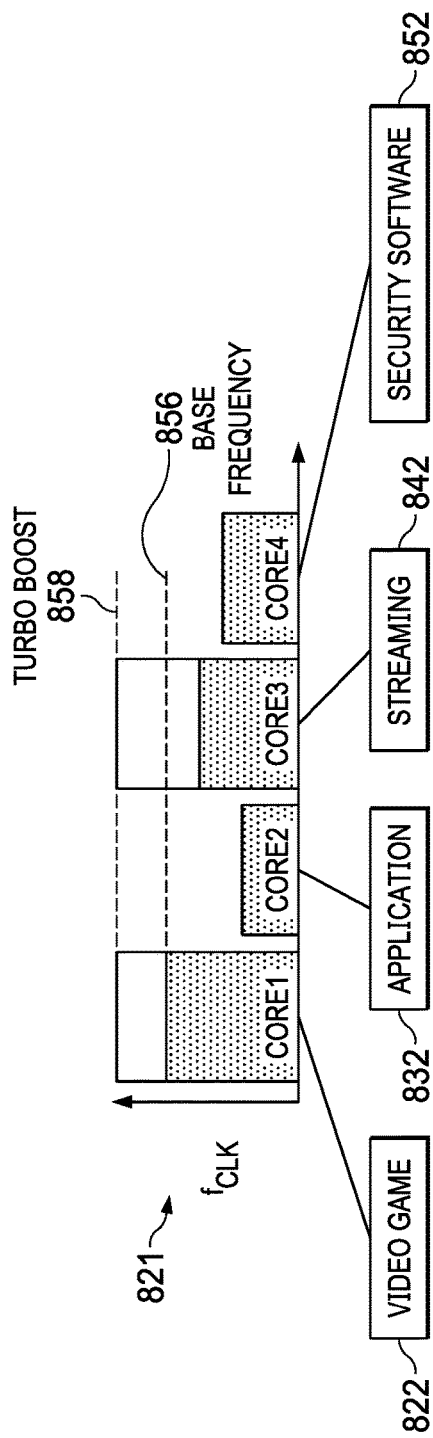
FIG. 8B is a graph showing different modes and clock frequencies for each core of a multi-core processor in accordance with various examples.

FIG. 8B is a graph 821 showing different modes and clock frequencies for each core (e.g., the cores 816A-816D in FIG. 8A) of a multi-core processor (e.g., the multi-core processor 813 in FIG. 8A) in accordance with various examples. In the example of FIG. 8B, a first core (CORE1) executes a video game application 822, where CORE1 is configured to switch between a first mode associated with a base frequency 856 and a second mode associated with a turbo-boost frequency 858. Also, a second core (CORE2) executes an application 832, where CORE2 is configured to operate at frequency below the base frequency 856. Also, a third core (CORE3) executes a streaming application 842, where CORE3 is configured to switch between a first mode associated with a frequency below the base frequency 856 and a second mode associated with the turbo-boost frequency 858. Also, a fourth core (CORE4) executes a security software application 832, where CORE4 is configured to operate at frequency below the base frequency 856. As represented in FIG. 8B, each of the cores of a multi-core processor may execute a different application and may support multiple clock frequency modes. In this example multi-core processor scenario, the ongoing variation in IOUT lends itself to a switching converter with pulse truncation as described herein.

Figure 9:
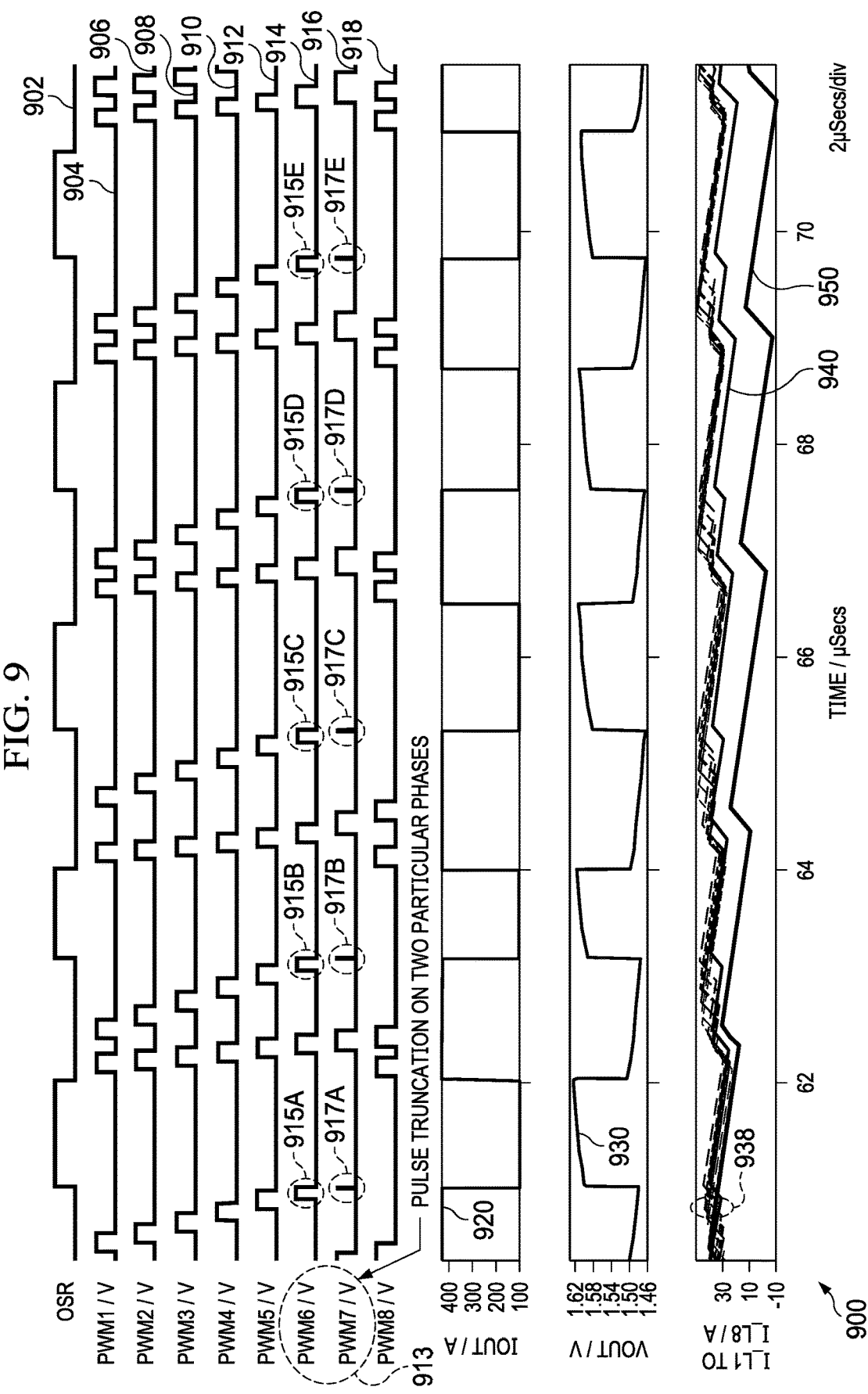
FIG. 9 is a timing diagram showing waveforms for a multi-phase switching converter with pulse truncation control in accordance with various examples.

FIG. 9 is a timing diagram 900 showing waveforms for a multi-phase switching converter (e.g., the multi-phase converter 700 of FIG. 7) with pulse truncation control in accordance with various examples. In the timing diagram 900, waveform 902 is an OSR signal, waveform 904 is a PWM1 signal, waveform 906 is a PWM2 signal, waveform 908 is a PWM3 signal, waveform 910 is a PWM4 signal, waveform 912 is a PWM5 signal, waveform 914 is a PWM6 signal, waveform 916 is a PWM7 signal, and waveform 918 is a PWM8 signal. Also, waveform 920 is an IOUT signal, waveform 930 is a VOUT signal, and waveforms 938 represent I_L1 to I_L8 signals, where waveform 940 corresponds to I_L6 and waveform 950 corresponds to I_L7.

In the timing diagram 900, the load varies over time, which causes IOUT to transition between high and low states as represented by the waveform 920. The changes in IOUT cause VOUT to change as represented by the waveforms 920 and 930. When VOUT is above a threshold, the OSR signal goes high as represented by the waveform 902. A high OSR signal results in pulse truncation of any high PWM pulses. In the example of FIG. 9, the timing of the OSR signal represented by the waveform 902 results in pulse truncation to various pulses 915A-915E corresponding to PWM6 and various pulses 917A-917E corresponding to PWM7. If pulse truncation repeatedly occurs on the same phases as represented in the timing diagram 900, the inductor current for these phases will be reduced over time as represented by the waveforms 940 and 950. An imbalanced reduction of inductor current in a multi-phase switching converter is undesirable. More importantly, the current imbalance could cause damages to power MOSFETs since the current sharing loop is broken in this case. To account for the possibility of such imbalances, a multi-phase switching converter may perform on-time compensation operations.

Figure 10:
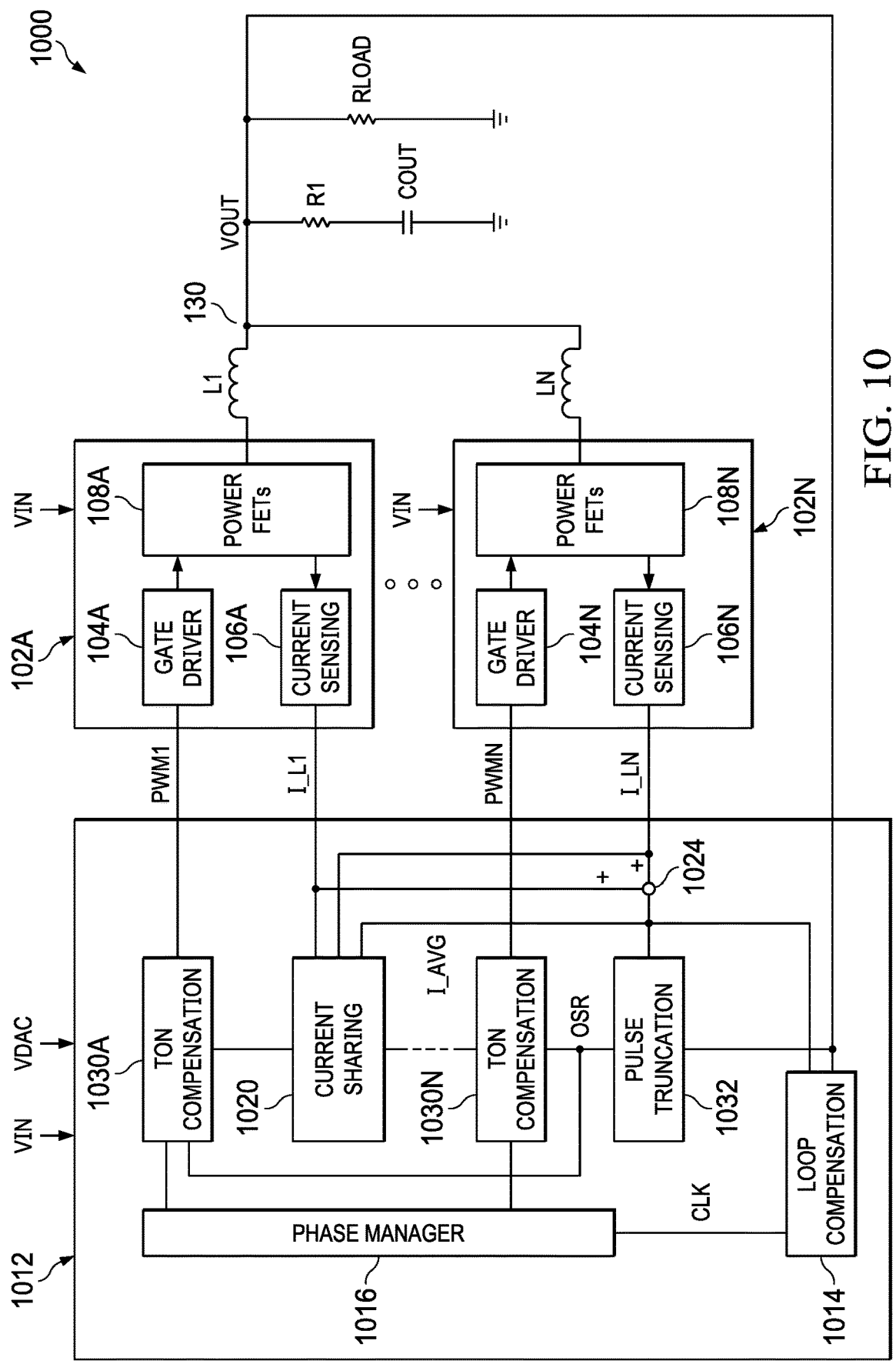
FIG. 10 is a schematic diagram showing a multi-phase switching converter with a pulse truncation circuit and on-time compensation circuits in accordance with various examples.

FIG. 10 is a schematic diagram showing a multi-phase switching converter 1000 with a pulse truncation circuit 1032 and on-time compensation circuits 1030A-1030N in accordance with various examples. As shown, the multi-phase switching converter 1000 includes the switching modules 102A-102N described in FIG. 1, along with L1-LN, R1, COUT, and RLOAD. Again, each of the plurality of switching modules 102A-102N includes a respective gate driver (e.g., gate drivers 104A-104N), a respective current sensing circuit (e.g., current sensing circuits 106A-106N), and respective switches (e.g., power FETs 108A-108N). In other examples, each of the switching modules 102A-102N includes additional or fewer components. Again, each output of the plurality of switching modules 102A-102N is coupled to the output node 130 via respective output inductors (L1-LN). The output node 130 is coupled to RLOAD, which is powered based on the operations of the switching modules 102A-102N and a controller 1012.

In the example of FIG. 10, the controller 1012 includes a loop compensation circuit 1014 and a phase manager circuit 1016 (comparable to the loop compensation circuit 114 and the phase manager circuit 116 in FIG. 1). The controller 1012 also includes a current sharing circuit 1020 (comparable to the current sharing circuit 120 in FIG. 1), a combine circuit 1024 (comparable to the combine circuit 124 in FIG. 1), Ton compensation circuits 1030A-1030N, and a pulse truncation circuit 1032. In operation, the pulse truncation circuit 1032 is configured to output an OSR signal in response to VOUT being greater than a threshold. The OSR signal is used by each of the Ton compensation circuits 1030A-1030N to perform pulse truncation operations and Ton compensation operations. With the multi-phase switching converter 1000 of FIG. 10, pulse truncation operations reduce VOUT overshoot and Ton compensation operations reduce inductor current imbalances.

Figure 11:
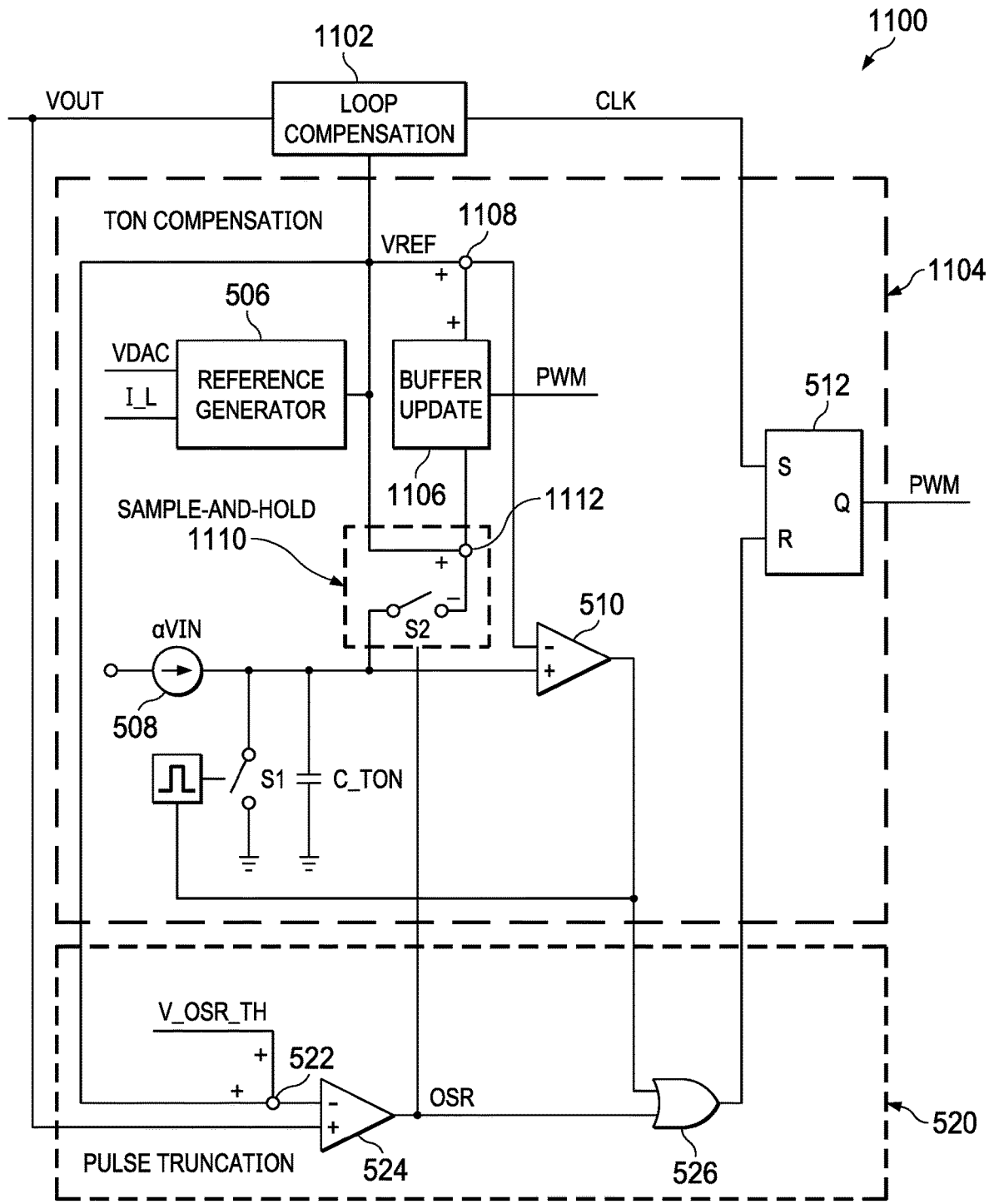
FIG. 11 is a schematic diagram showing a switching converter controller with a pulse truncation circuit and an on-time compensation circuit in accordance with various examples.

FIG. 11 is a schematic diagram showing a switching converter controller 1100 with a pulse truncation circuit 520 and an on-time compensation circuit 1104 in accordance with various examples. As shown, the pulse truncation circuit 520 in FIG. 11 is the same as the pulse truncation circuit 520 in FIG. 5. Meanwhile, the Ton compensation circuit 1104 is an example of each of the Ton compensation circuits 1030A-1030N in FIG. 10. In the example of FIG. 11, the Ton compensation circuit 1100 includes many of the components introduced for the Ton generator circuit 504. More specifically, the Ton compensation circuit 1100 includes the reference generator circuit 506, current source 508, S1, C_TON, the comparator 510, and the latch 512. In addition, the Ton compensation circuit 1104 includes a sample-and-hold (S&H) circuit 1110, a buffer update circuit 1106, and a combine circuit 1108. As shown, the S&H circuit 1110 includes a switch (S2) and a combine circuit 1112. Also, the controller 1100 includes a loop compensation circuit 1102 configured to provide CLK signals based on VOUT and VREF as described herein.

In operation, the Ton compensation circuit 1104 and the pulse truncation circuit 520 are configured to perform the Ton generation operations and pulse truncation operations of the Ton generator circuit 504 and the pulse truncation circuit 520 described in FIG. 5, except that the VREF value input to the comparator 510 is adjusted to account for Ton compensation operations. The Ton compensation operations are performed using the S&H circuit 1110, the buffer update circuit 1106 and the combine node 1108. More specifically, when OSR is high, S2 closes to initiate Ton compensation operations. In the example of FIG. 11, Ton compensation is achieved using the S&H circuit 1110 to subtract the voltage on C_TON from VREF. The result of this subtraction corresponds to the pulse truncation amount which is provided to the buffer update circuit 1106. Once the pulse truncation amount is determined, the buffer update circuit 1106 is able to extend a later PWM pulse to account for the pulse truncation amount. Also, the buffer update circuit 1106 is configured to adjust VREF to account for the pulse truncation amount. In one example, the buffer update circuit 1106 causes the pulse truncation amount to be compensated for in a single later pulse. In another example, the buffer update circuit 1106 causes the pulse truncation amount to be compensated for in multiple later pulses. In different examples, the pulse truncation circuit 520 and the Ton compensation circuit 1104 may be applied to single-phase switching converters or to multi-phase switching converters (e.g., the multi-phase switching converter 1000 in FIG. 10). With the Ton compensation circuit 1104, the amount of duty cycle that is truncated is added back in one or more later PWM cycles using buffers.

Figure 12:
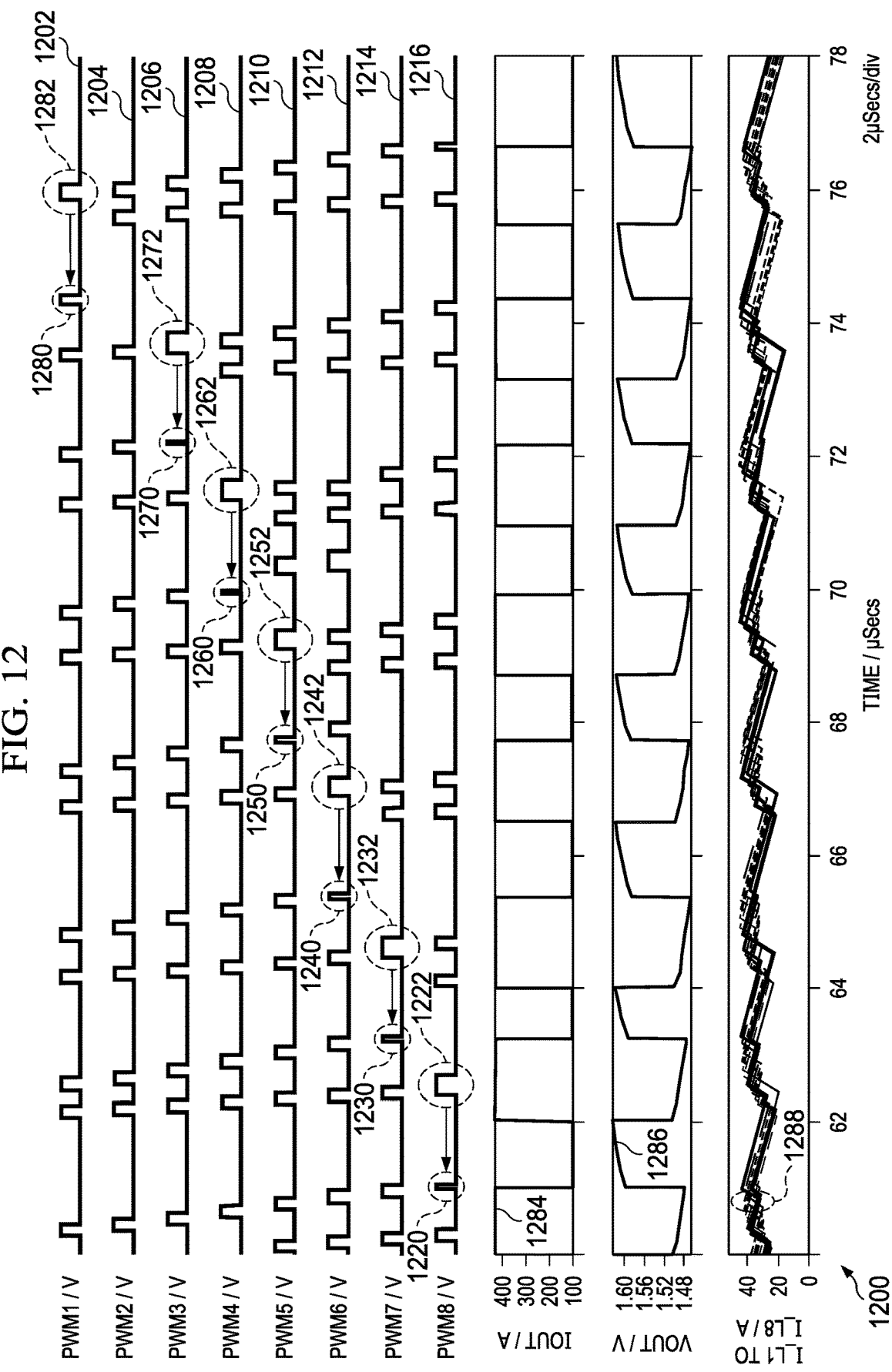
FIG. 12 is a timing diagram showing waveforms for a multi-phase switching converter with pulse truncation and on-time compensation control in accordance with various examples.

FIG. 12 is a timing diagram 1200 showing waveforms for a multi-phase switching converter (e.g., the multi-phase converter 1000 in FIG. 10) with pulse truncation and on-time compensation control in accordance with various examples. In the timing diagram 1200, waveform 1202 is a PWM1 signal, waveform 1204 is a PWM2 signal, waveform 1206 is a PWM3 signal, waveform 1208 is a PWM4 signal, waveform 1210 is a PWM5 signal, waveform 1212 is a PWM6 signal, waveform 1214 is a PWM7 signal, and waveform 1216 is a PWM8 signal. Also, waveform 1284 is an IOUT signal, waveform 1286 is a VOUT signal, and waveforms 1288 represent I_L1 to I_L8 signals.

In the timing diagram 1200, the load varies over time, which causes IOUT to transition between high and low states as represented by the waveform 1284. The changes in IOUT cause VOUT to change as represented by the waveforms 1284 and 1286. When VOUT is above a threshold, the OSR signal goes high (not shown). A high OSR signal results in pulse truncation of any high PWM pulses. In the example of FIG. 1200, the timing of the OSR signal results in pulse truncation to various pulses, resulting in truncated pulse 1220 (related to PWM8), truncated pulse 1230 (related to PWM7), truncated pulse 1240 (related to PWM6), truncated pulse 1250 (related to PWM5), truncated pulse 1260 (related to PWM4), truncated pulse 1270 (related to PWM3), and truncated pulse 1280 (related to PWM1). In the example of FIG. 12, each of these truncated pulses is followed by an elongated pulse that accounts for the amount of pulse truncation. More specifically, the truncated pulse 1220 (related to PWM8) is followed by elongated pulse 1222, the truncated pulse 1230 (related to PWM7) is follow by elongated pulse 1232, the truncated pulse 1240 (related to PWM6) is followed by elongated pulse 1242, the truncated pulse 1250 (related to PWM5) is followed by elongated pulse 1252, the truncated pulse 1260 (related to PWM4) is followed by elongated pulse 1262, the truncated pulse 1270 (related to PWM3) is followed by elongated pulse 1272, and the truncated pulse 1280 (related to PWM1) is followed by elongated pulse 1282. With Ton compensation, the inductor currents (I_L1 to I_L8) represented by the waveforms 1288 have good dynamic current sharing.

Figure 13:
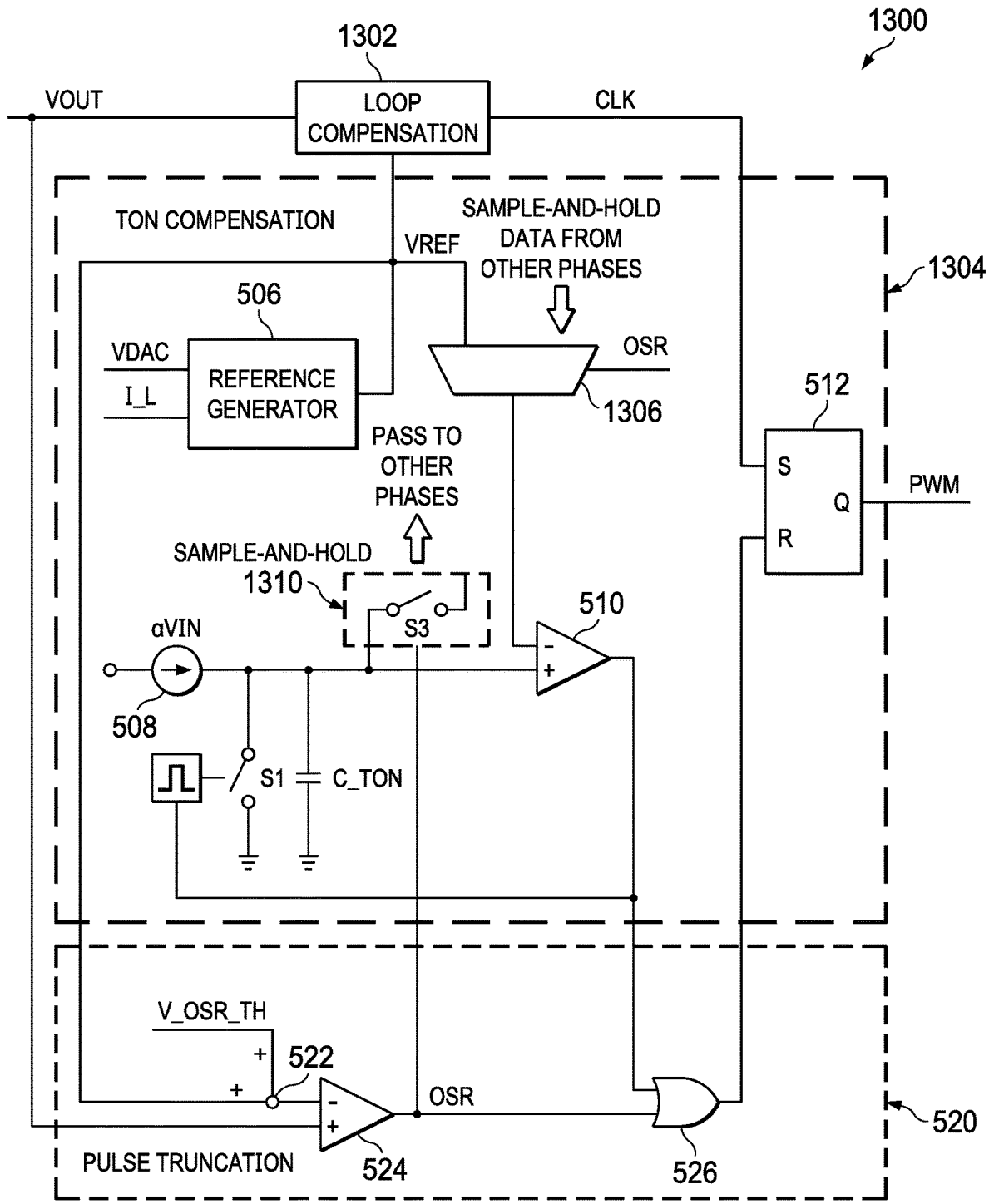
FIG. 13 is a schematic diagram showing a switching converter controller with a pulse truncation circuit and an on-time compensation circuit in accordance with various examples.

FIG. 13 is a schematic diagram showing a switching converter controller 1300 with the pulse truncation circuit 520 and an on-time compensation circuit 1304 in accordance with various examples. As shown, the pulse truncation circuit 520 in FIG. 13 is the same as the pulse truncation circuit 520 in FIG. 5. Meanwhile, the Ton compensation circuit 1304 is an example of each of the Ton compensation circuits 1030A-1030N. In the example of FIG. 11, the Ton compensation circuit 1300 includes many of the components introduced for the Ton generator circuit 504. More specifically, the Ton compensation circuit 1300 includes the reference generator circuit 506, current source 508, S1, C_TON, the comparator 510, and the latch 512. In addition, the Ton compensation circuit 1304 includes an S&H circuits 1306 and 1310. As shown, the S&H circuit 1310 includes a switch (S3) configured to pass OSR to other phases of a multi-phase switching converter (e.g., the multi-phase switching converter 1000 in FIG. 10). Also, the S&H circuit 1306 stores S&H data from other phases, where the stored S&H data is released in response to OSR being high. With the S&H circuits 1306 and 1310, the sampled duty cycle that is truncated in one phase is used to truncate the duty cycles of any other phases in a following PWM cycle. In this manner, the phase currents are balanced by applying the same truncation to all phases.

Figure 14:
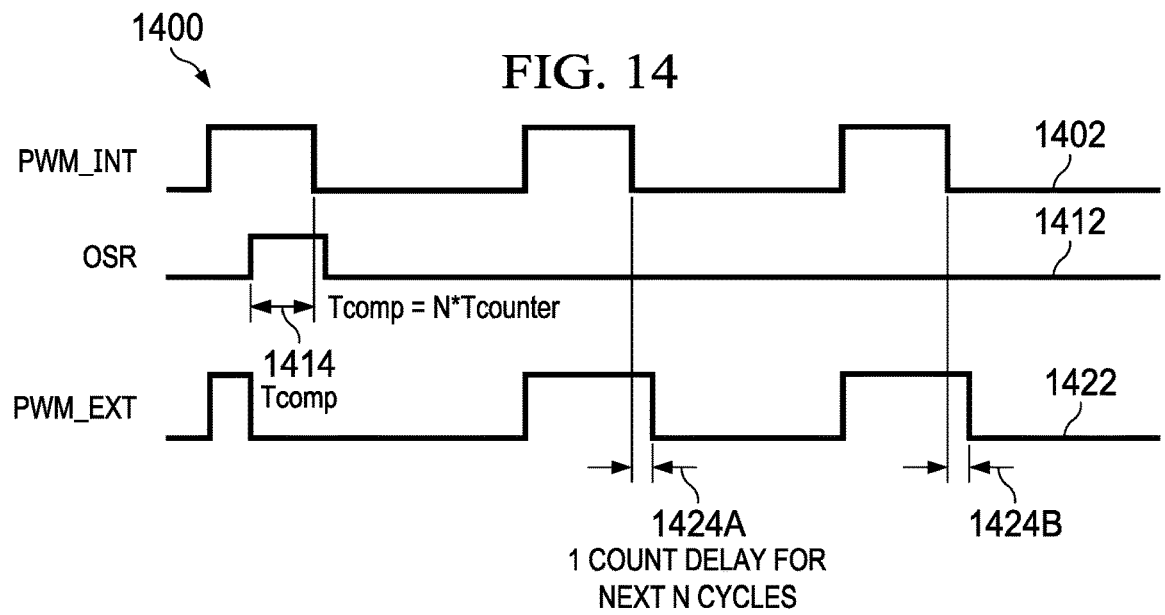
FIG. 14 is a timing diagram showing pulse truncation and on-time compensation in accordance with various examples.

FIG. 14 is a timing diagram 1400 showing pulse truncation and on-time compensation in accordance with various examples. In the timing diagram 1400, the waveform 1402 represents a PWM_INT signal, the waveform 1412 represents an OSR signal, and the waveform 1422 represents a PWM_EXT signal. The waveforms 1402, 1012, and 1422 represent a scenario where the delay between the time of pulse truncation to the actual event of PWM falling edge is recorded using a counter. Thereafter, Ton is increased in subsequent cycles. In the timing diagram, Tcomp 1414 corresponds to the delay that needs to be compensated. If Tcounter is the time of the counter and if there are N cycles, a falling edge delay of one count is created for the next N cycles (e.g., delays 1424A and 1424B are added in the timing diagram 1400). Adding only one count delay ensures that the ripples between phases do not instantaneously and drastically change.

Figure 15:
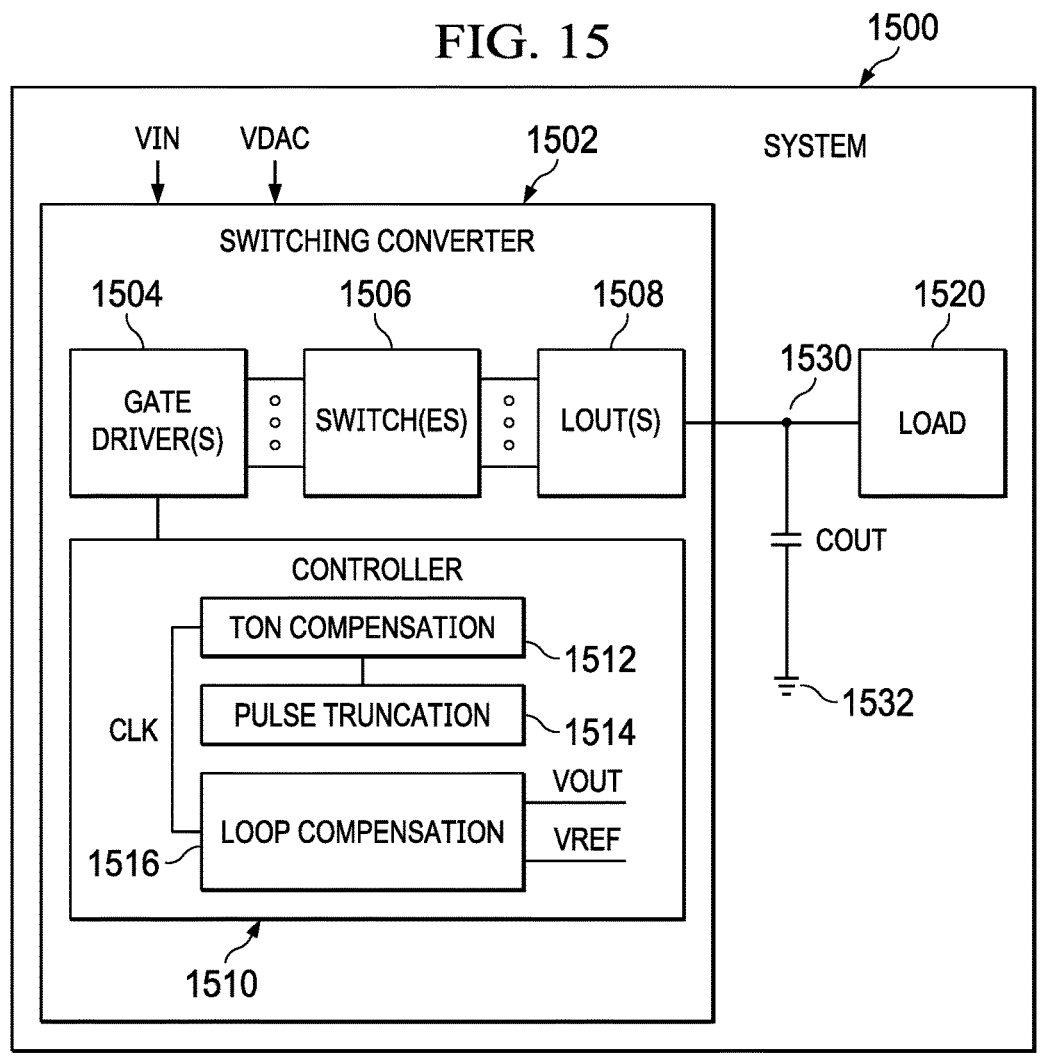
FIG. 15 is a block diagram of a system in accordance with various examples.

FIG. 15 is a block diagram of a system 1500 in accordance with various examples. As shown, the system 1500 includes a switching converter circuit 1502 configured to receive VIN and VDAC. In some examples, VIN is received from the input voltage source, and VDAC is either a pre-set regulation target voltage, or an adjustable voltage received from the microprocessors. In different examples, the switching converter circuit 1502 is a single-phase switching converter or a multi-phase switching converter. As shown, the switching converter circuit 1502 includes gate driver(s) 1504 coupled to switch(s) 1506 (see e.g., the switching modules 102A-102N described herein). The switch(s) 1506 is coupled to at least one output inductor, LOUT(s) 1508.

Based on the operation of a controller 1510, the gate driver(s) 1504 cause the switch(es) 1506 to open or close, resulting in providing power to the output node 1530 via LOUT(s) 1508. As shown, an output capacitor (COUT) is coupled between the output node 1530 and a ground node 1532, where the charge stored by COUT is VOUT, which is applied to a load 1520. In some examples, the load 1520 is a multi-core processor (e.g., the multi-core processor 813 in FIG. 8A). For example, the system 1500 may be an enterprise server with a multi-core processor, where each core supports one or more applications and different frequencies (e.g., a base frequency, a turbo-boost frequency, and/or other frequencies as described in FIGS. 8A and 8B). Also, in some examples, the load 1520 includes dynamic random-access memory (DRAM).

In some examples, the controller 1510 is configured to adjust a pulse clock rate (e.g., CLK) and a switch on-time (Ton) for each switching module of a single-phase or multi-phase switching converter. In the example of FIG. 15, the controller 1510 includes a pulse truncation circuit 1514 (e.g., the pulse truncation circuit 520 in FIG. 5), a Ton compensation circuit 1512 (e.g., the Ton compensation circuits 1030A-1030N in FIG. 10, the Ton compensation circuit 1104 in FIG. 11, the Ton compensation circuit 1304 in FIG. 13), and a loop compensation circuit 1516 (e.g., an example of the loop compensation circuit 502 in FIG. 5, the loop compensation circuit 714 in FIG. 7, the loop compensation circuit 1014 in FIG. 10, the loop compensation circuit 1102 in FIG. 11, or the loop compensation circuit 1302 in FIG. 13). In some examples, the loop compensation circuit 1516 provides a CLK signal to the Ton compensation circuit 1512, where the CLK signal is based on VOUT and VREF for the switching converter circuit 1502.

In some examples, the pulse truncation circuit 1514 is configured to detect a voltage overshoot condition (e.g., an asserted OSR signal) and to truncate an active switch on-time pulse (e.g., by asserting the reset signal of a latch such as the latch 512) in response to the detected voltage overshoot condition. In the example of FIG. 15, the Ton compensation circuit 1512 is coupled to the pulse truncation circuit 1512, where the Ton compensation circuit 1512 is configured to determine when pulse truncation is performed by the pulse truncation circuit 1514 and to extend or reduce at least one later pulse in response to the pulse truncation. In some examples, the Ton compensation circuit 1512 is configured to determine an amount of pulse truncation and to extend at least one later pulse based on the determined amount of pulse truncation. In one example, the Ton compensation circuit 1512 is configured to extend one single-phase pulse in response to the pulse truncation. In another example, the Ton compensation circuit 1512 is configured to extend multiple single-phase pulses in response to the pulse truncation. In another example, the on-time compensation circuit 1512 is configured to reduce a plurality of multi-phase pulses in response to the pulse truncation.

In some examples, the pulse truncation circuit 1514 comprises a comparator (e.g., the comparator 524) with a first input node (e.g., the positive input terminal) coupled to an output node (e.g., node 130 in FIGS. 7 and 10) of a switching converter circuit and with a second input node (e.g., the negative input terminal) coupled to an overshoot voltage threshold node (e.g., the output of the combine circuit 522 in FIG. 5). In some examples, a switch on-time circuit (e.g., the Ton generator circuit 504 in FIG. 5, or part of the Ton compensation circuit 1512) is coupled to the pulse truncation circuit 1514, where the switch on-time circuit comprises a pulse control latch (e.g., the latch 512 in FIG. 5) coupled to the pulse truncation circuit 1514.

In some examples, the switching converter circuit 1502 is a single-phase switching converter, where the Ton compensation circuit 1512 is coupled to a switch on-time circuit (e.g., the components of the Ton generator circuit 504 in FIG. 5) and is configured to extend at least one later pulse in response to a truncated pulse. In some examples, the switching converter circuit 1502 includes a plurality of switching modules (e.g., the switching modules 102A-102N, where the switching converter circuit 1502 also includes a Ton compensation circuit 1512 configured to determine when pulse truncation is performed and to adjust at least one later pulse for one or more of the plurality of switching modules in response to the pulse truncation. In some examples, the Ton compensation circuit 1512 is configured to determine an amount of pulse truncation associated with a given switching module and to adjust at least one later pulse for one or more of the plurality of switching modules based on the amount of pulse truncation. In some examples, the Ton compensation circuit 1512 is configured to extend a plurality of multi-phase pulses based on the amount of pulse truncation. In some examples, the Ton compensation circuit 1512 is configured to reduce a plurality of multi-phase pulses based on the amount of pulse truncation.

With the proposed switching converters, pulse truncation is performed to reduce the overshoot voltage. As desired, the remaining duty ratio (Ton) info may be recorded and then leveraged to compensate the duty ratios in later PWM cycles to ensure dynamic current sharing all the time. The proposed Ton compensation options can be applied to each individual operational phase, so that even more than one particular phase is truncated for multiple load cycles. For example, the duty ratio for all phases can be compensated instead of just compensating the last phase being truncated. With pulse truncation, the size of the output capacitor can be reduced. With Ton compensation, dynamic current sharing is achieved, which improves reliability.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A circuit comprising:
 a loop compensation circuit having a loop compensation output;

a first comparator having a first comparator input, a second comparator input, and a first comparator output, the first comparator input adapted to be coupled to a switching output;
a compensation circuit comprising a second comparator and a latch, the second comparator having a third comparator input, a fourth comparator input, and a second comparator output, the latch having a first latch input and a second latch input, the first latch input coupled to the loop compensation output; and
a logic circuit having a first logic input, a second logic input, and a logic output, the first logic input coupled to the first comparator output and the second logic input coupled to the second comparator output, the logic output coupled to the second latch input.

2. The circuit of claim 1, wherein the compensation circuit configured to extend at least one later pulse in response to a truncated pulse.

3. The circuit of claim 1, wherein the compensation circuit is configured to determine an amount of pulse truncation and to extend only one single-phase pulse based on the amount of pulse truncation.

4. The circuit of claim 1, wherein the compensation circuit is configured to determine an amount of pulse truncation and to extend multiple single-phase pulses based on the amount of pulse truncation.

5. The circuit of claim 1, wherein the compensation circuit is configured to determine when pulse truncation is performed and to adjust at least one later pulse for one or more switching circuits in response to the pulse truncation.

6. The circuit of claim 5, wherein the compensation circuit is configured to determine an amount of pulse truncation associated with a given switching circuit and to adjust at least one later pulse for one or more of the switching circuits based on the amount of pulse truncation.

7. The circuit of claim 6, wherein the compensation circuit is configured to extend a plurality of multi-phase pulses based on the amount of pulse truncation.

8. The circuit of claim 6, wherein the compensation circuit is configured to reduce a plurality of multi-phase pulses based on the amount of pulse truncation.

9. A method, comprising:
in response to detecting a voltage overshoot condition, truncating, by pulse truncation circuitry, a first pulse; and
in response to detecting that the pulse truncation circuit truncates the first pulse, adjusting, by compensation circuitry, a duration of a second pulse.

10. The method of claim 9, further comprising extending, by the compensation circuitry, the second pulse in response to the pulse truncation.

11. The method of claim 9, further comprising:
determining, by the compensation circuitry, an amount of pulse truncation; and
extending only one pulse based on the amount of pulse truncation.

12. The method of claim 9, further comprising:
determining, by the compensation circuitry, an amount of pulse truncation; and
extending multi-phase pulses based on the amount of pulse truncation.

13. The method of claim 9, further comprising:
determining, by the compensation circuitry, an amount of pulse truncation; and
reducing multi-phase pulses based on the amount of pulse truncation.

14. A system, comprising:
a first switching circuit;
a second switching circuit; and
a controller coupled to the first switching circuit and to the second switching circuit, the controller comprising:
a loop compensation circuit;
a phase manager coupled to the loop compensation circuit;
a first on-time generation circuit coupled to the first switching circuit and to the phase manager;
a second on-time generation circuit coupled to the second switching circuit and to the phase manager; and
a current sharing circuit coupled to the first on-time generation circuit and to the second on-time generation circuit.

15. The system of claim 14, wherein the loop compensation circuit is configured to produce a clock signal based on a combined current value and an average inductor current value.

16. The system of claim 15, wherein the phase manager circuit is configured to:
select a first phase for the first on-time generation circuit.

17. The system of claim 14, wherein the first switching circuit is adapted to be coupled to a load, and the load comprises a multi-core processor.

18. The system of claim 14, further comprising:
a first inductor coupled to the first switching circuit; and
a second inductor coupled to the second switching circuit.

19. The system of claim 14, wherein the first switching circuit comprises:
a gate driver;
power transistors coupled to the gate driver; and
a current sensing circuit coupled to the power transistors and to the current sharing circuit.

* * * * *